US012577458B2

(12) United States Patent
Choi et al.

(10) Patent No.: US 12,577,458 B2
(45) Date of Patent: Mar. 17, 2026

(54) LUMINESCENT NANOPARTICLES AND METHOD FOR PREPARING SAME

(71) Applicant: The Industry & Academic Cooperation in Chungnam National University (IAC), Daejeon (KR)

(72) Inventors: Jihoon Choi, Daejeon (KR); Min-Gi Jeon, Daejeon (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 505 days.

(21) Appl. No.: 18/179,531

(22) Filed: Mar. 7, 2023

(65) Prior Publication Data

US 2024/0026220 A1 Jan. 25, 2024

(30) Foreign Application Priority Data

Jul. 20, 2022 (KR) ........................ 10-2022-0089516

(51) Int. Cl.
*C09K 11/66* (2006.01)
*C09K 11/02* (2006.01)

(52) U.S. Cl.
CPC .......... *C09K 11/665* (2013.01); *C09K 11/025* (2013.01)

(58) Field of Classification Search
CPC ............................ C09K 11/665; C09K 11/025
USPC .................................................... 252/301.36
See application file for complete search history.

(56) References Cited

FOREIGN PATENT DOCUMENTS

| | | |
|---|---|---|
| KR | 10-1724210 B1 | 4/2017 |
| KR | 10-2020-0062664 A | 6/2020 |
| KR | 10-2391382 B1 | 4/2022 |

OTHER PUBLICATIONS

Yuxin Zong et al., "Spatial and chemical confined ultra-small $CsPbBr_3$ perovskites in dendritic mesoporous silica nanospheres with enhanced stability", Microporous and Mesoporous Materials, 2020, pp. 1-9, vol. 302, No. 110229.

Xiaoxuan Di et al., "Efficient white LEDs with bright green-emitting $CsPbBr_3$ perovskite nanocrystal in mesoporous silica nanoparticles", Journal of Alloys and Compounds, 2017, pp. 526-532, vol. 729.

Min-Gi Jeon et al., "Highly processable and stable PMMA-grafted $CsPbBr_3$-$SiO_2$ nanoparticles for down- conversion photoluminescence", Composites Part B, 2022, pp. 1-10, vol. 239, No. 109956.

Naresh et al., "Synthesis of $CsPbX_3$ (X = Cl/Br, Br, and Br/I)@$SiO_2$/PMMA composite films as color- conversion materials for achieving tunable multi-color and white light emission", Nano Research, vol. 14, 2021, pp. 1187-1194 (9 pages total).

Communication dated Aug. 23, 2024, issued in Korean Application No. 10-2022-0089516.

(Continued)

*Primary Examiner* — Anita Nassiri-Motlagh
(74) *Attorney, Agent, or Firm* — Sughrue Mion, PLLC

(57) ABSTRACT

Proposed are luminescent nanoparticles and a method of preparing the same. The luminescent nanoparticles include a core-shell composite and a polymer brush grafted on the surface of the composite, in which the composite is composed of a core containing porous silica nanoparticles and $CsPbX_3$ (X is a halogen) perovskite nanocrystal supported in the porous silica nanoparticles and a lead-containing silicate shell formed on the surface of the core.

13 Claims, 18 Drawing Sheets

(56) References Cited

OTHER PUBLICATIONS

Guo-hui Hong et al., "In-situ sintered $CsPbBr_3$/$CsPb2Br_5$ perovskite nanocrystals into mesoporous silica for white high-efficiency LEDs", Journal of Solid State Chemistry, 2022, vol. 310, No. 123032, pp. 1-8 (8 pages).
Guoqing Tong et al., "From film to ring: Quasi-circular inorganic lead halide perovskite grain induced growth of uniform lead silicate glass ring structure", Applied Physics Letters, 2022, vol. 120, No. 161604, pp. 1-7 (9 pages).
Da Hye Park et al., "Facile synthesis of thermally stable $CsPbBr_3$ perovskite quantum dotinorganic $SiO_2$ composites and their application to white light-emitting diodes with wide color gamut", Dyes and Pigments, 2018, vol. 149, pp. 246-252 (7 pages).
Jin Han et al., "Nanosized Organo-Silica Particles with "Built-In" Surface-Initiated Atom Transfer Radical Polymerization Capability as a Platform for Brush Particle Synthesis", ACS Macro Letters, 2020, vol. 9, pp. 1218-1223 (6 pages).

【Fig. 1】
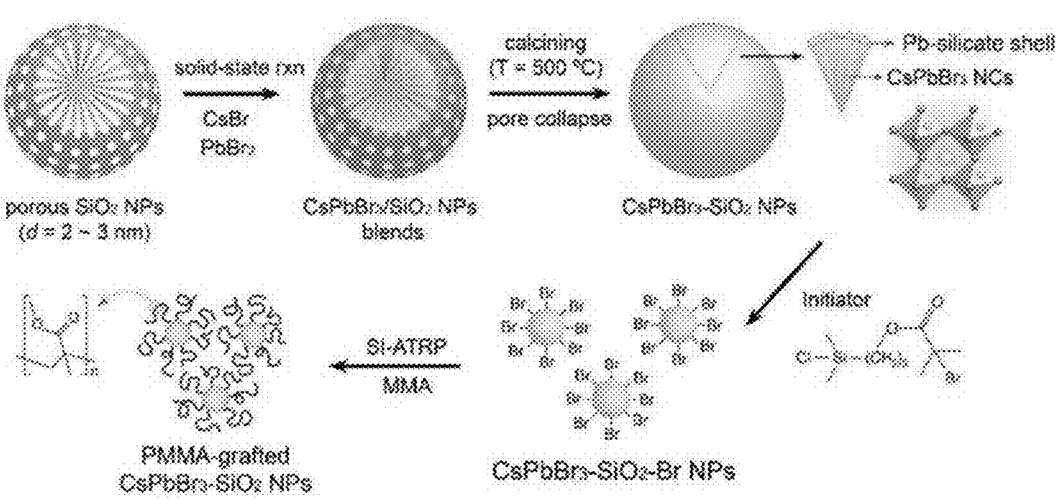
【Fig. 2】
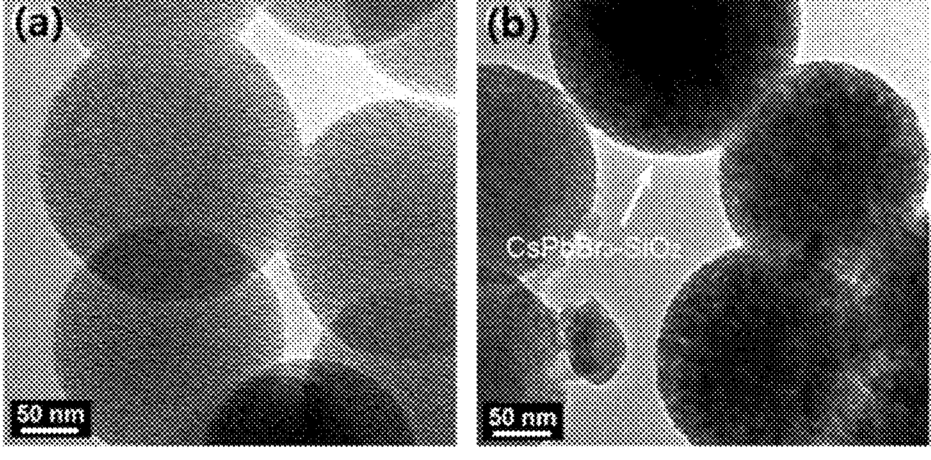

【Fig. 3】
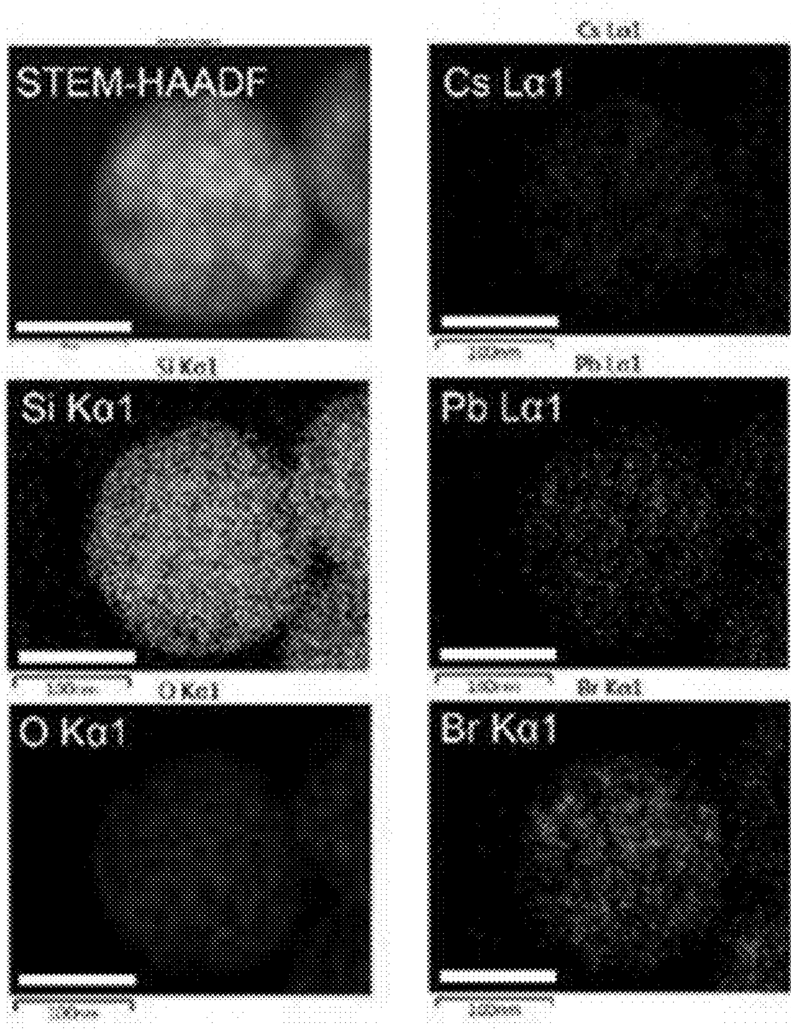

【Fig. 4】
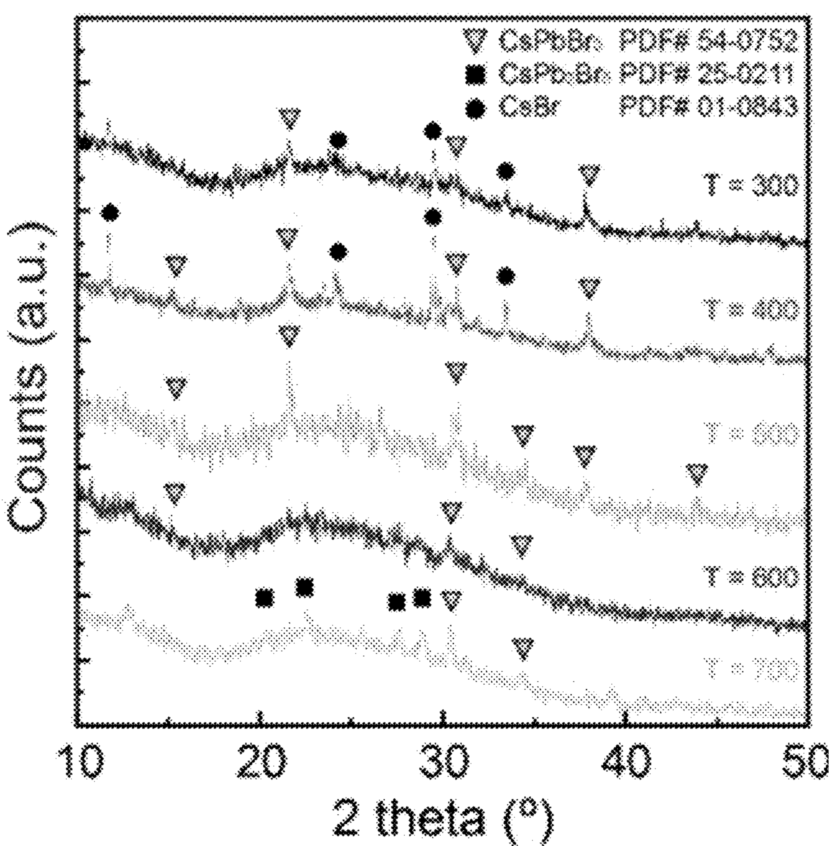

【Fig. 5】
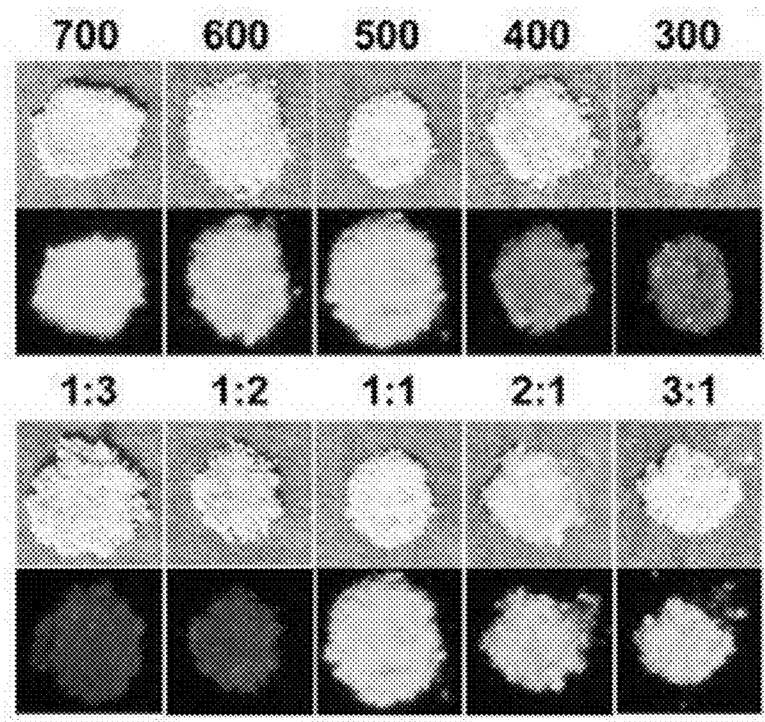

【Fig. 6】
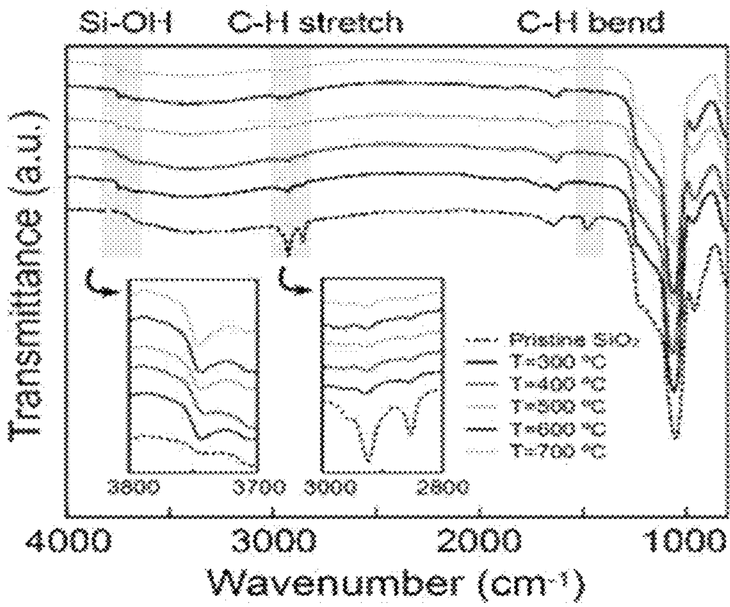
【Fig. 7】
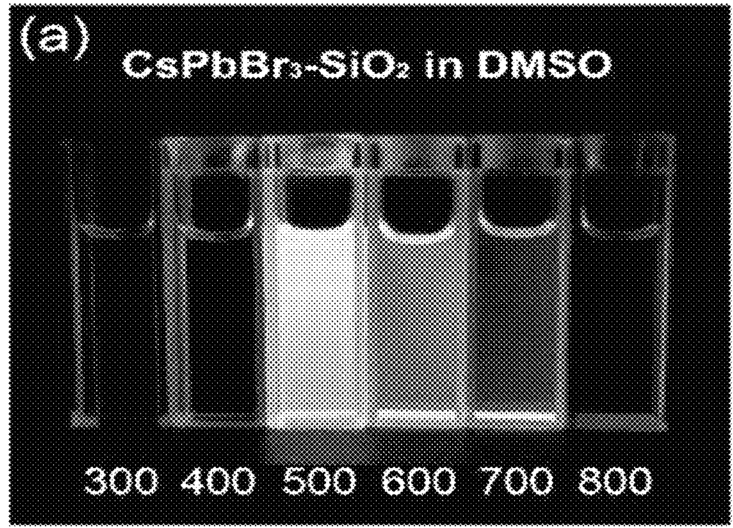

【Fig. 8】
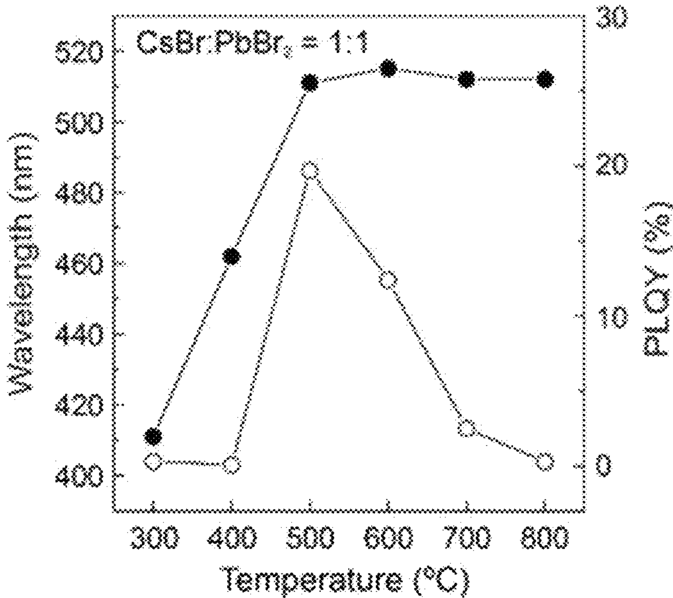
【Fig. 9】
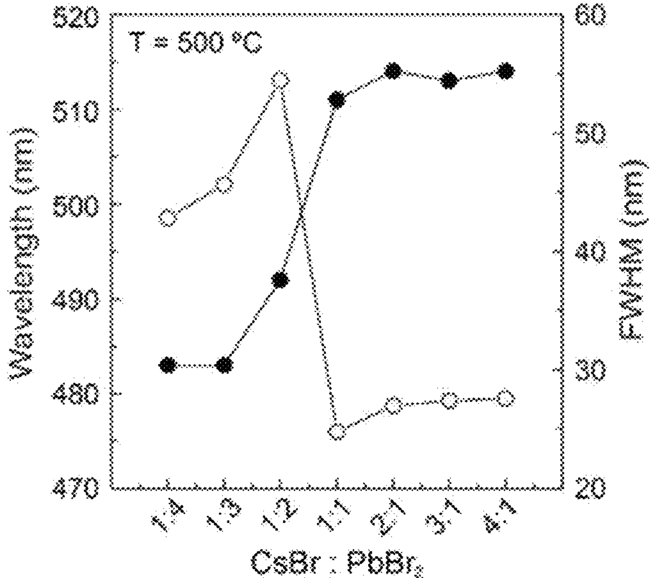

【Fig. 10】
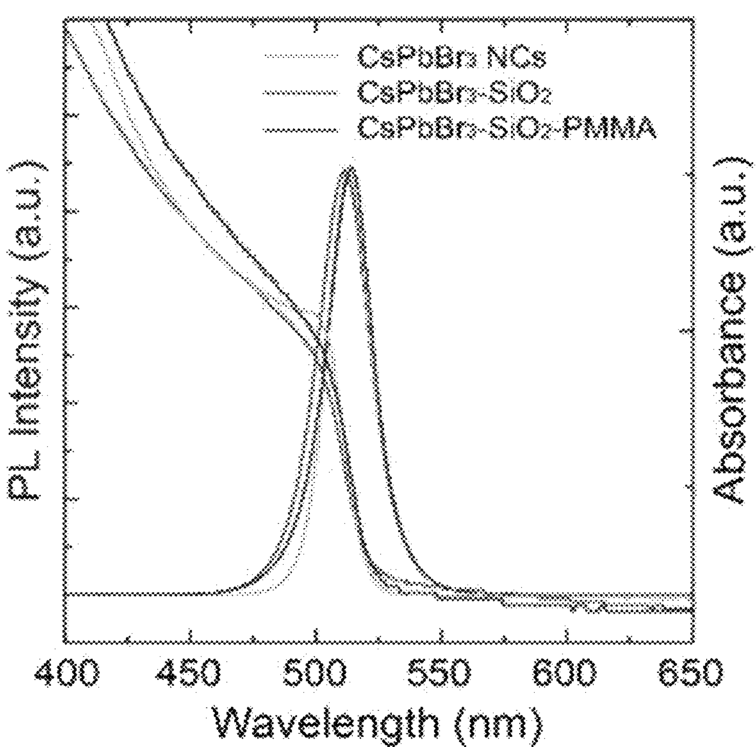

【Fig. 11】
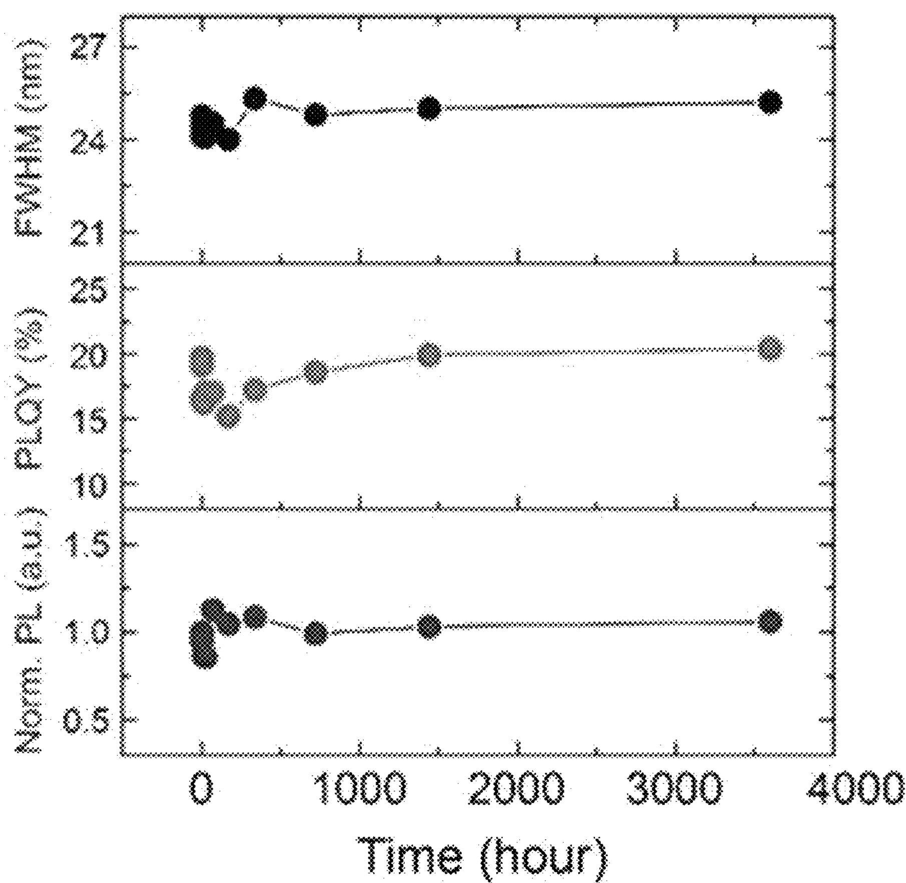

【Fig. 12】
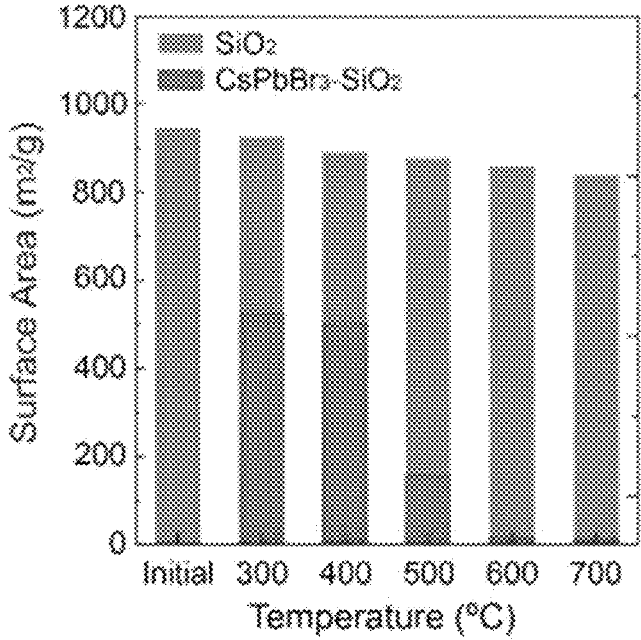
【Fig. 13】
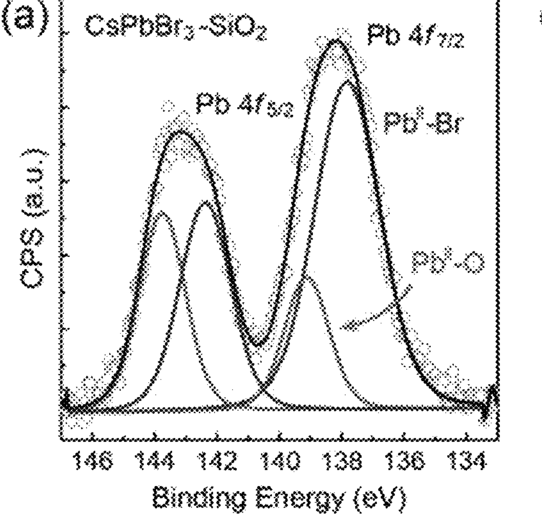
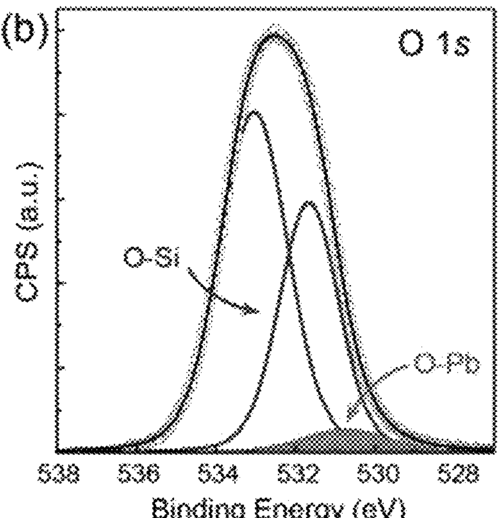

【Fig. 14】
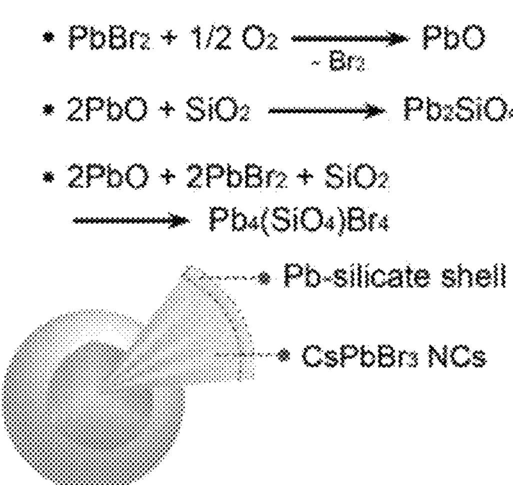
【Fig. 15】
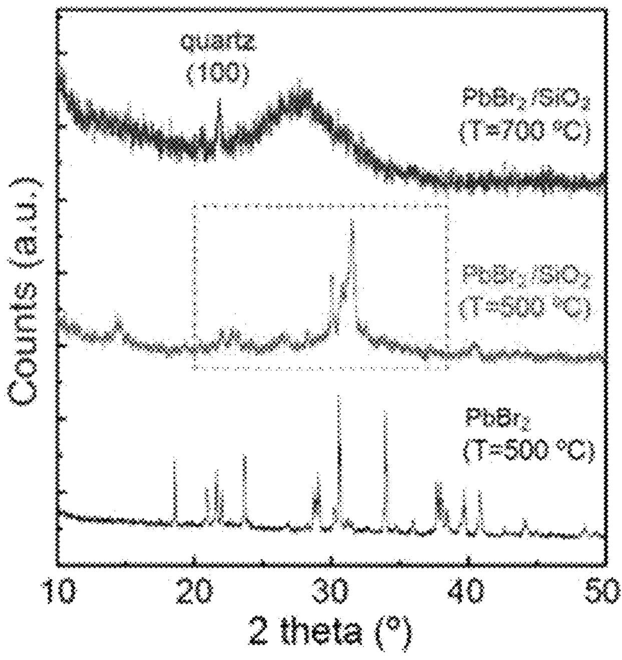

【Fig. 16】
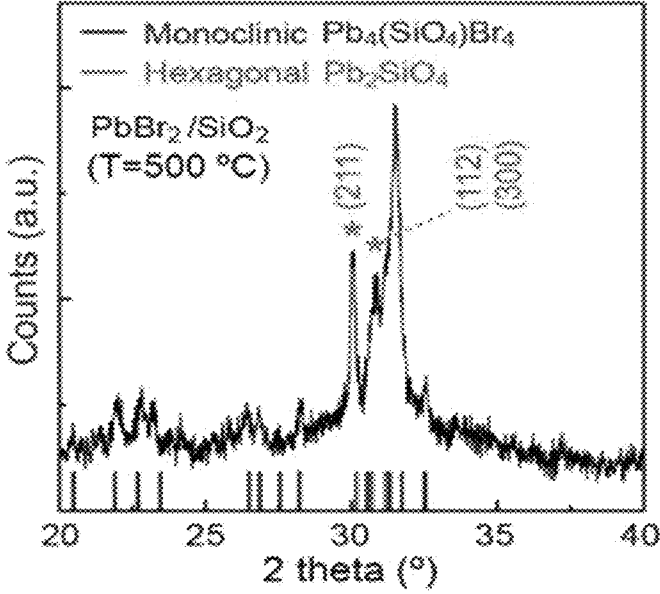
【Fig. 17】
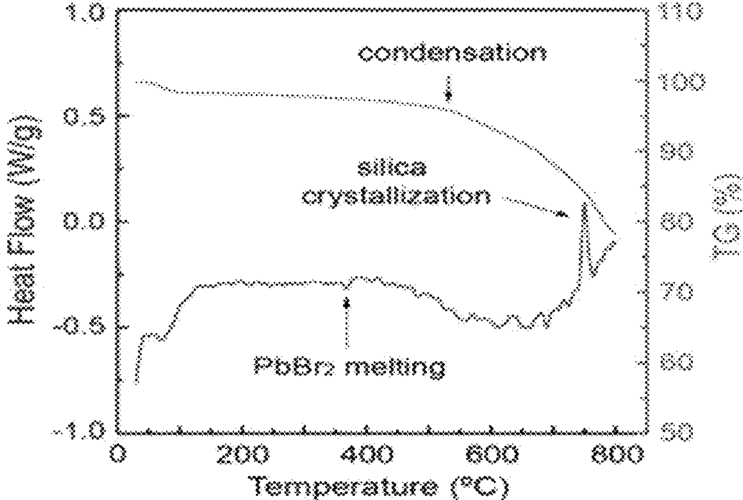

【Fig. 18】
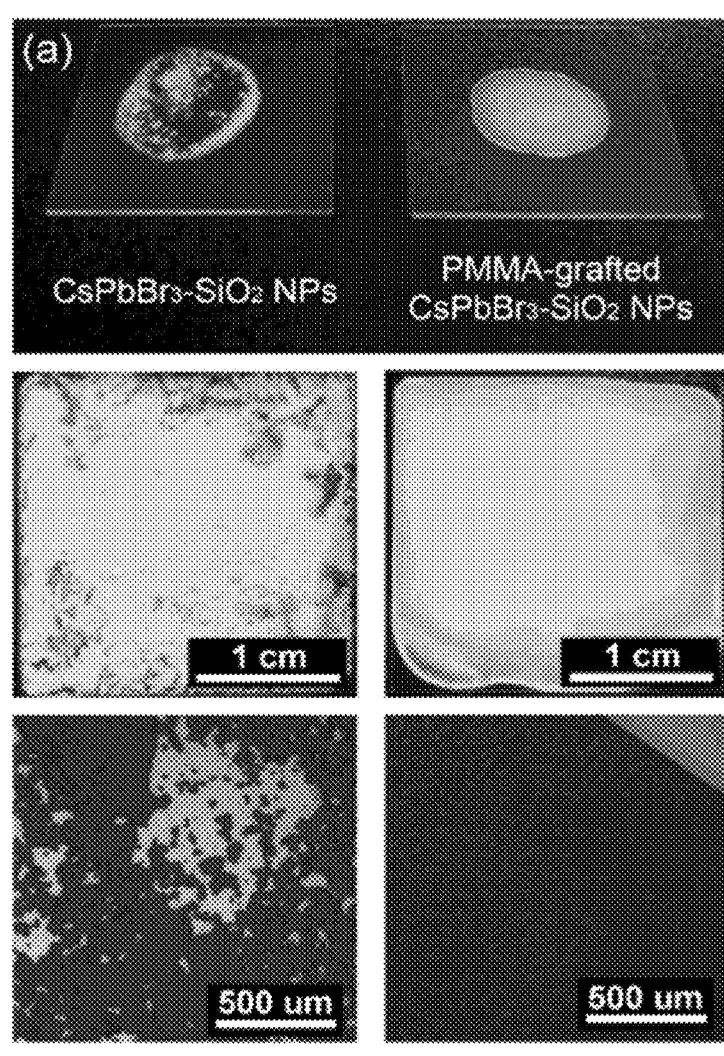

【Fig. 19】
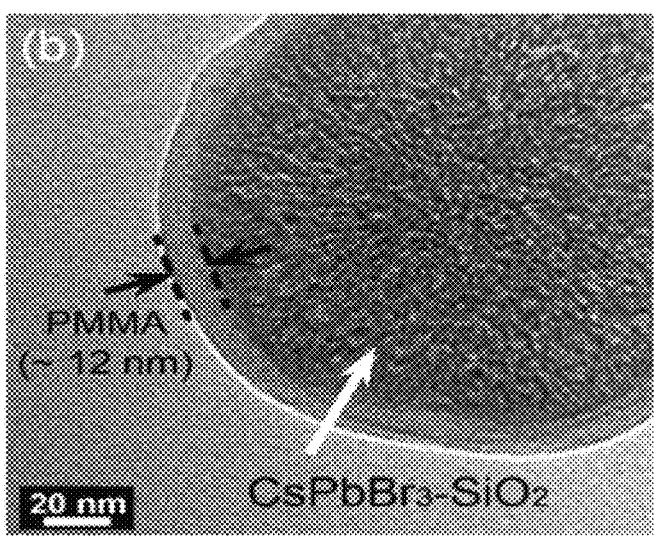
【Fig. 20】
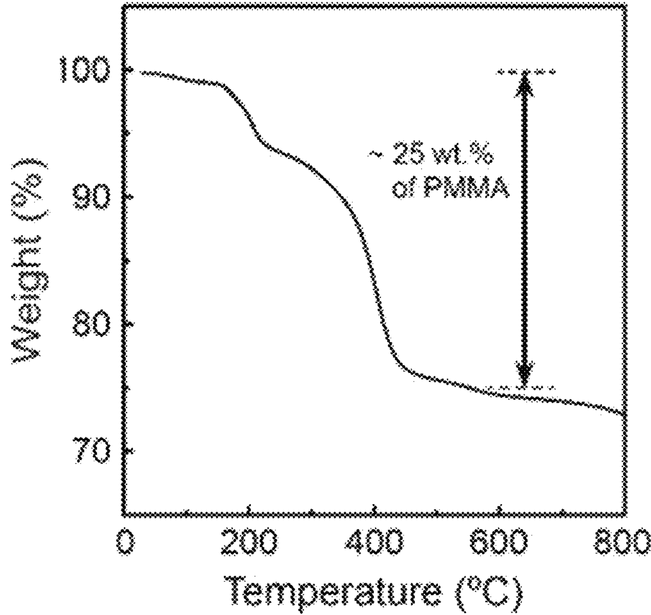

【Fig. 21】
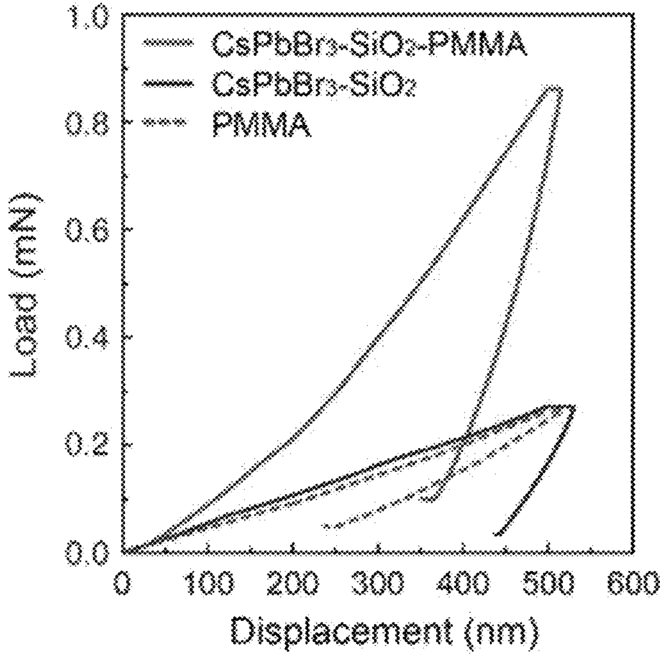
【Fig. 22】
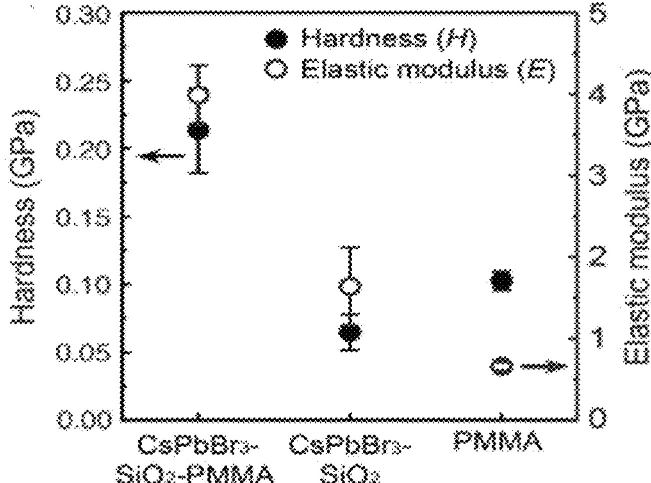

【Fig. 23】
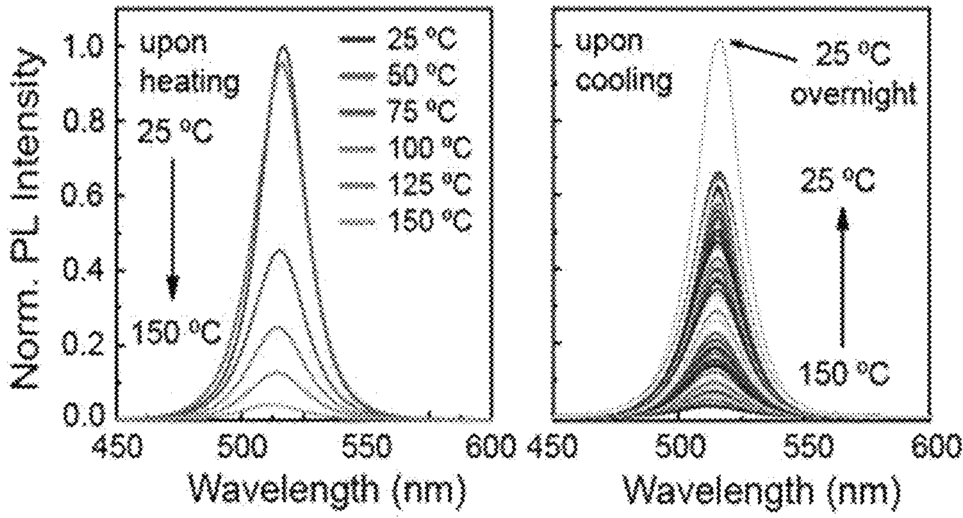
【Fig. 24】
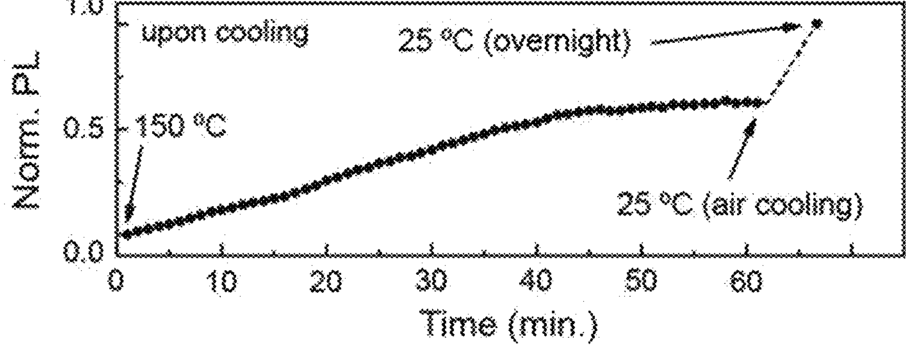

【Fig. 25】
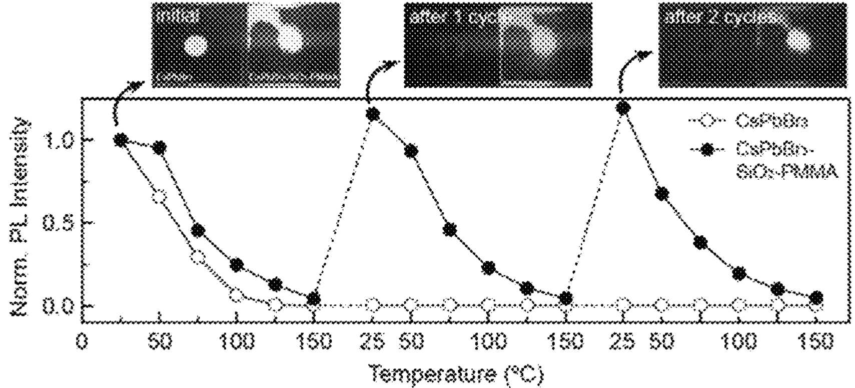
【Fig. 26】
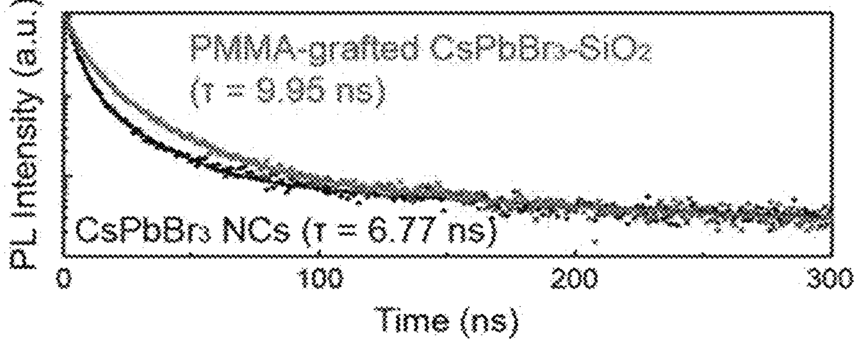
【Fig. 27】
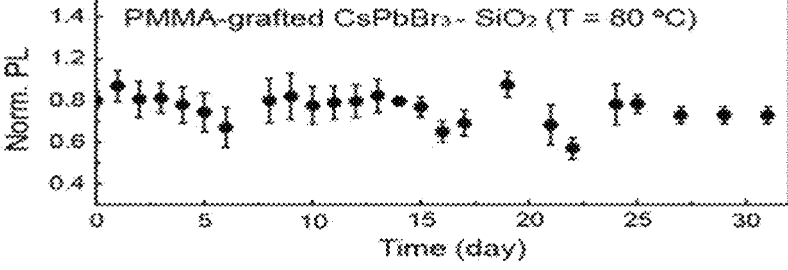

【Fig. 28】
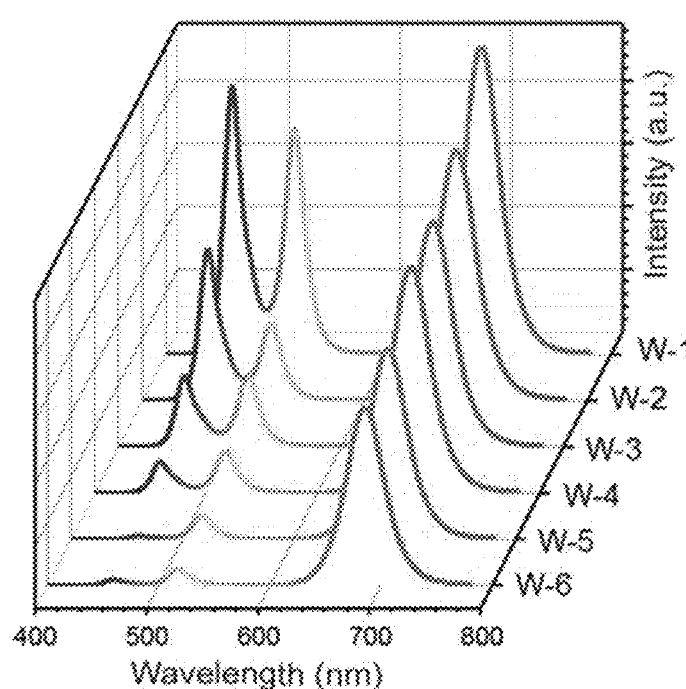

【Fig. 29】
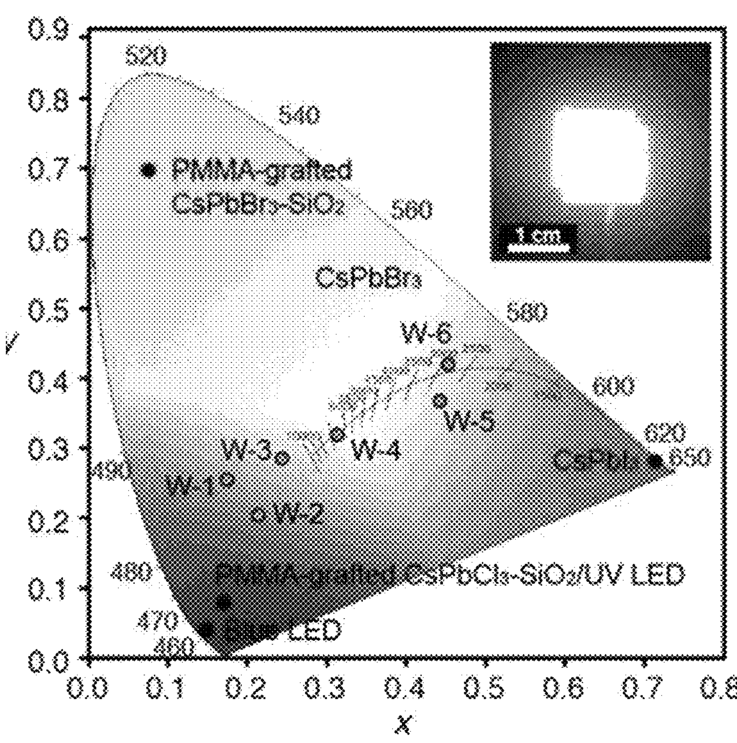

LUMINESCENT NANOPARTICLES AND METHOD FOR PREPARING SAME

The present application claims priority to Korean Patent Application No. 10-2022-0089516, filed on Jul. 20, 2022, the entire contents of which is incorporated herein for all purposes by this reference.

BACKGROUND OF THE INVENTION

1. Field of the Invention

The present disclosure relates to luminescent nanoparticles and a method of preparing the same.

2. Description of the Related Art

Luminescent nanomaterials have applications not only in displays based on light emitting diodes and lasers but also in a wide range of fields such as biosensors and bio-imaging, and lead material innovation based on unique characteristics thereof that have not been observed in existing bulk materials.

Such luminescent nanomaterials provide excellent photostability through appropriate encapsulation, but the actual deposition and patterning techniques are disadvantageous in that significant agglomerates, cracks, and non-uniform packing are formed during the drying process, and complicated post-processing is required to avoid such problems.

On the other hand, Korean Patent No. 10-1724210 is proposed as a similar related literature.

LITERATURES OF THE RELATED ART

Patent Literature (Patent Literature 1) Korean Patent No. 10-1724210 (Mar. 31, 2017)

SUMMARY OF THE INVENTION

In order to solve the above problems, an objective of the present disclosure is to provide luminescent nanoparticles having excellent photostability, wettability, processability, and mechanical properties, and a method for preparing the same.

However, the above objective is illustrative, and the technical spirit of the present disclosure is not limited thereto.

One aspect of the present disclosure for achieving the above objective relates to luminescent nanoparticles, the luminescent nanoparticles include a composite including: a core containing porous silica nanoparticles and $CsPbX_3$ (X is a halogen) perovskite nanocrystal supported in the porous silica nanoparticles; a lead-containing silicate shell formed on the surface of the core; and a polymer brush grafted on the surface of the composite.

In the above aspect, the porous silica nanoparticles may have a size in a range of 100 to 500 nm and an average pore diameter in a range of 1 to 10 nm.

In the above aspect, the polymer brush may include an acrylic polymer prepared by an atom transfer radical polymerization (ATRP) reaction.

In the above aspect, the halogen X may be any one or a mixture of two or more selected from the group consisting of Br, Cl, and I.

In addition, another aspect of the present disclosure relates to a method for preparing luminescent nanoparticles, the method including: a) mixing and pulverizing porous silica nanoparticles, CsX, and $PbX_2$ (X is halogen); b) calcining the pulverized mixture to prepare a composite; c) modifying the surface of the composite with a silane compound containing a halogen group; and d) grafting a polymer brush to the surface of the modified composite, in which the composite includes: a core including porous silica nanoparticles and $CsPbX_3$ (X is halogen) perovskite nanocrystals supported on the porous silica nanoparticles; and a lead-containing silicate shell formed on the surface of the core.

In another aspect described above, the calcination of step b) may be performed in a range of 300° C. to 1000° C.

In another aspect described above, the calcination of step b) may be performed for 1 to 10 hours.

In another aspect described above, the silane compound containing a halogen group of step c) may be any one or a mixture of two or more selected from the group consisting of 3-(2-bromoisobutyloxy)propyldimethylchlorosilane, 3-(2-bromoisobutyloxy)propyldichloromethylsilane, 3-(2-bromoisobutyloxy)propyltrichlorosilane, 3-(methoxydimethylsilylpropyl)-2-bromo-2-methylpropionate, 3-(dimethoxymethylsilylpropyl)-2-bromo-2-methylpropionate, 3-(trimethoxysilylpropyl)-2-bromo-2-methylpropionate, (3-(2-bromoisobutyryl)propyl)dimethylethoxysilane, (3-(2-bromoisobutyryl)propyl)methyldiethoxysilane, (3-(2-bromoisobutyryl)propyl)triethoxysilane, (3-(2-bromopropionyl) propyl)dimethylchlorosilane, (3-(2-bromopropionyl)propyl)trichlorosilane, (3-(2-bromopropionyl)propyl)dimethylmethoxysilane, (3-(2-bromopropionyl)propyl)dimethylethoxysilane, and (3-(2-bromopropionyl)propyl)triethoxysilane.

In another aspect described above, the polymer brush of step d) may be prepared by an atom transfer radical polymerization (ATRP) reaction.

In another aspect described above, the step d) may be performed by reacting a modified composite, an acrylic monomer, a metal catalyst, and the ligand.

In another aspect described above, the weight ratio of the porous silica nanoparticles:CsX and $PbX_2$ is 1:0.1 to 10.

In another aspect described above, the molar ratio of $CsX:PbX_2$ may be 1 to 10:1.

In another aspect described above, the porous silica nanoparticles may have a size in a range of 100 to 500 nm and an average pore diameter in a range of 1 to 10 nm.

The luminescent nanoparticles, according to the present disclosure, may have better photostability and excellent wettability, processability, and mechanical properties.

BRIEF DESCRIPTION OF THE DRAWINGS

FIG. 1 is a schematic diagram briefly showing a method for preparing luminescent nanoparticles according to an embodiment of the present disclosure;

FIG. 2 is a transmission electron microscope (TEM) image of (a) porous $SiO_2$ NPs and (b) $CsPbBr_3$—$SiO_2$ NPs prepared according to Preparation Example 3;

FIG. 3 is a high-angle annular dark-field scanning transmission electron microscope (HAADF-STEM) and energy dispersive spectroscopy (EDS) mapping image of $CsPbBr_3$—$SiO_2$ NPs prepared according to Preparation Example 3;

FIG. 4 is an X-ray diffraction (XRD) pattern analysis result of $CsPbBr_3$—$SiO_2$ NPs prepared by varying the calcination temperature according to Preparation Examples 1 to 5;

FIG. 5 is real photographic images of $CsPbBr_3$—$SiO_2$ nanoparticles synthesized under various conditions under daylight and UV illumination (λ=365 nm);

FIG. 6 is FT-IR spectra of $SiO_2$ nanoparticles treated under various heat treatment temperature conditions;

FIG. 7 is a real photographic image under UV illumination (λ=365 nm) of $CsPbBr_3$—$SiO_2$ nanoparticles (in DMSO) treated at various heat treatment temperature conditions;

FIG. 8 is a data analyzing the maximum PL wavelength (λmax) and photoluminescence quantum yield (PLQY) of $CsPbBr_3$—$SiO_2$ nanoparticles treated under various heat treatment temperature conditions;

FIG. 9 is a data analyzing the maximum PL wavelength (λmax) and full width at half maximum (FWHM) of $CsPbBr_3$—$SiO_2$ nanoparticles prepared under various molar ratio conditions;

FIG. 10 is a data analyzing the PL wavelength (λmax) and absorbance spectra of $CsPbBr_3$ NCs synthesized through a high-temperature injection method, $CsPbBr_3$—$SiO_2$, and $CsPbBr_3$—$SiO_2$ NPs grafted with PMMA;

FIG. 11 is a data analyzing changes in PL intensity, FWHM, and PLQY when $CsPbBr_3$—$SiO_2$ NPs were dispersed in DMSO and then stored for 5 months or longer;

FIG. 12 is Brunauer-Emmett-Teller (BET) surface area analysis data of pure $SiO_2$ and $CsPbBr_3$—$SiO_2$ nanoparticles treated at various heat treatment temperature conditions;

FIG. 13 is a representative high-resolution X-ray photoelectron spectroscopy (XPS) spectrum of $CsPbBr_3$—$SiO_2$ nanoparticles calcined at 500° C.;

FIG. 14 is a schematic diagram showing the lead-containing silicate formation reaction at the interface between $CsPbBr_3$ and the silanol moiety of porous $SiO_2$ nanoparticles;

FIGS. 15 and 16 are XRD pattern analysis results of $CsPbBr_3$—$SiO_2$ nanoparticles;

FIG. 17 is a TGA/DSC thermal image analysis result of $CsPbBr_3$—$SiO_2$ nanoparticles;

FIG. 18 shows photographs of $CsPbBr_3$—$SiO_2$ (left panel) and PMMA-grafted $CsPbBr_3$—$SiO_2$ (right panel) NPs films under UV illumination (λ=365 nm) and optical images;

FIG. 19 is a TEM image of $CsPbBr_3$—$SiO_2$ nanoparticles grafted with PMMA;

FIG. 20 is a thermogravimetric analysis (TGA) curve of $CsPbBr_3$—$SiO_2$ nanoparticles grafted with PMMA;

FIG. 21 is an elastic modulus analysis data of a $CsPbBr_3$—$SiO_2$ film and a PMMA-grafted $CsPbBr_3$—$SiO_2$ NPs film;

FIG. 22 is a hardness analysis data of a $CsPbBr_3$—$SiO_2$ film and a PMMA-grafted $CsPbBr_3$—$SiO_2$ NPs film;

FIGS. 23 to 25 are photostability evaluation data of a $CsPbBr_3$ film and a PMMA-grafted $CsPbBr_3$—$SiO_2$ film at an operating temperature (25° C. to 150° C.);

FIG. 26 is a data analyzing the PL decay time of the $CsPbBr_3$—$SiO_2$ film and the PMMA-grafted $CsPbBr_3$—$SiO_2$ NPs film;

FIG. 27 is a data analyzing photostability over time of $CsPbBr_3$—$SiO_2$ film grafted with PMMA;

FIG. 28 shows the output spectra of LEDs composed of a mixture of $CsPbX_3$—$SiO_2$ NPs (X=Cl and Br) and $CsPbI_3$ NCs (W-1 to W-6) grafted with PMMA on a 460 nm InGaN chip; and FIG. 29 is the CIE color coordinates of $CsPbX_3$—$SiO_2$ NPs (X=Cl and Br), $CsPbI_3$ NCs, and mixtures thereof (W-1 to W-6) grafted on PMMA, and the insertion drawing is a real photograph of the PMMA grafted $CsPbBr_3$—$SiO_2$ film under UV light.

DESCRIPTION OF THE PREFERRED EMBODIMENTS

Hereinafter, luminescent nanoparticles and a manufacturing method thereof, according to the present disclosure, will be described in detail. The following drawings are provided as examples to sufficiently convey the spirit of the present disclosure to those skilled in the art. Accordingly, the present disclosure is not limited to the drawings and may be embodied in other foams, and the drawings presented below may be exaggerated to clarify the spirit of the present disclosure. In the flowing description, unless otherwise defined, all terms, including technical and scientific tams used herein, have the same meaning as commonly understood by those who are ordinarily skilled in the art to which this disclosure belongs. Further, when it is determined that the detailed description of the known art related to the present disclosure might obscure the gist of the present disclosure, the detailed description thereof will be omitted.

One aspect of the present disclosure relates to luminescent nanoparticles, the luminescent nanoparticles include a composite including: a core containing porous silica nanoparticles and $CsPbX_3$ (X is a halogen) perovskite nanocrystal supported in the porous silica nanoparticles; a lead-containing silicate shell formed on the surface of the core; and a polymer brush grafted on the surface of the composite.

As such, the luminescent nanoparticles, according to the present disclosure, are not only supported by $CsPbX_3$ (X is halogen) perovskite nanocrystals, which are luminescent materials, on porous silica nanoparticles, but also have lead-containing silicate shells and polymer brushes foamed on their surfaces, thereby having excellent photostability, excellent wettability, processability, and mechanical properties.

Hereinafter, components of the luminescent nanoparticles, according to an embodiment of the present disclosure, will be described in more detail.

As described above, the luminescent nanoparticle, according to an embodiment of the present disclosure, is composed of a composite and a polymer brush grafted on the surface of the composite, and the composite may be composed of a core including porous silica nanoparticles and perovskite nanocrystals supported therein and a lead-containing silicate shell formed on the surface of the core.

In one embodiment of the present disclosure, the porous silica nanoparticles are a porous carrier serving as a framework of the core, and the porous silica nanoparticles may have a size in a range of 100 to 500 nm, an average pore diameter in a range of 1 to 10 nm, and more preferably a size in a range of 150 to 300 nm, and an average pore diameter in a range of 1.5 to 5 nm. In addition, the specific surface area of the porous nanoparticles may be 500 to 2000 $m^2/g$, and more preferably 800 to 1500 $m^2/g$. Within this range, perovskite nanocrystals can be effectively formed inside the pores of the porous silica nanoparticles, and excellent luminescent properties can be exhibited.

The perovskite nanocrystals supported in the pores of the porous silica nanoparticles may be $CsPbX_3$ (X is halogen), in which the halogen X may be any one or a mixture of two or more selected from the group consisting of Br, Cl, and I.

In one embodiment of the present disclosure, the lead-containing silicate shell is formed by reacting lead (Pb), a component of the perovskite precursor material, and porous silica nanoparticles when forming perovskite nanocrystals. As shown in FIG. 14, the lead-containing silicate may include $Pb_2SiO_4$ and $Pb_4(SiO_4)Br_4$. In addition, the lead-containing silicate shell may have a thickness in a range of 1 to 50 nm, more preferably in a range of 3 to 30 nm. Within this range, the perovskite nanocrystals supported in the pores of the porous silica nanoparticles are effectively protected so that better photostability can be secured.

On the other hand, the polymer brush grafted on the surface of the composite may include an acrylic polymer prepared by an atom transfer radical polymerization (ATRP) reaction, and specifically, for example, the acrylic polymer may be prepared by homopolymerization or copolymerization reaction of an acrylic monomer, and the acrylic monomer may be any one or a mixture of two or more selected from the group consisting of alkyl (meth)acrylates such as methyl (meth)acrylate, ethyl (meth)acrylate, butyl (meth) acrylate, 2-ethylhexyl (meth)acrylate, n-octyl (meth)acrylates; hydroxyalkyl (meth)acrylates such as hydroxyethyl (meth)acrylate, hydroxypropyl (meth)acrylate, hydroxybutyl (meth)acrylate, and hydroxyhexyl (meth)acrylate; aminoalkyl (meth)acrylates such as aminoethyl (meth)acrylate, N,N-dimethylaminoethyl (meth)acrylate, and t-butylaminoethyl (meth)acrylate; alkoxyalkyl (meth)acrylates such as methoxyethyl (meth)acrylate and ethoxyethyl (meth)acrylate; carboxy group-containing monomers such as (meth)acrylic acid and carboxyethyl (meth)acrylate; and epoxy group-containing monomers such as glycidyl (meth) acrylate, and the like. As a preferred embodiment, the polymer brush may be polymethyl methacrylate (PMMA) prepared by homopolymerizing methyl (meth)acrylate through an atom transfer radical polymerization (ATRP) reaction.

As shown in FIG. 19, the polymer brush may have a thickness in a range of 5 to 50 nm, more preferably, in a range of 10 to 30 nm. Within this range, the perovskite nanocrystals supported in the pores of the porous silica nanoparticles are effectively protected so that better photostability can be secured.

In addition, another aspect of the present disclosure relates to a method for preparing the above-described luminescent nanoparticles, in detail the method including: a) mixing and pulverizing porous silica nanoparticles, CsX, and $PbX_2$ (X is halogen); b) calcining the pulverized mixture to prepare a composite; c) modifying the surface of the composite with a silane compound containing a halogen group; and d) grafting a polymer brush to the surface of the modified composite, in which the composite includes: a core including porous silica nanoparticles and $CsPbX_3$ (X is halogen) perovskite nanocrystals supported on the porous silica nanoparticles; and a lead-containing silicate shell formed on the surface of the core.

First, a) mixing and pulverizing porous silica nanoparticles, CsX, and $PbX_2$ (X is halogen) may be performed.

As described above, the porous silica nanoparticles are a porous carrier serving as a framework of the core, and the porous silica nanoparticles may have a size in a range of 100 to 500 nm, an average pore diameter in a range of 1 to 10 nm, and more preferably a size in a range of 150 to 300 nm, and an average pore diameter in a range of 1.5 to 5 nm. In addition, the specific surface area of the porous nanoparticles may be 500 to 2000 $m^2/g$, and more preferably 800 to 1500 $m^2/g$. Within this range, perovskite nanocrystals can be effectively formed inside the pores of the porous silica nanoparticles, and excellent luminescent properties can be exhibited.

A process of mixing and pulverizing the porous silica nanoparticles with CsX and $PbX_2$ (X is halogen) may be pertained, and through this, CsX and $PbX_2$ may be supported in the pores of the porous silica nanoparticles.

At this time, the weight ratio of the porous silica nanoparticles:CsX and $PbX_2$ is 1:0.1 to 10, more preferably 1:0.5 to 5, and even more preferably 1:1 to 3. Within this range, it is possible to secure luminescent nanoparticles having more excellent luminescent properties.

In addition, the molar ratio of CsX:$PbX_2$ may be 1 to 10:1, more preferably 1:5 to 1, most preferably 1:1. Within this range, it is possible to secure luminescent nanoparticles having more excellent luminescent properties.

Next, b) preparing a composite by calcining the pulverized mixture may be performed. In this process, CsX and $PbX_2$, which are perovskite precursors, may react to form $CsPbX_3$ perovskite nanocrystals, and in this process, lead (Pb), a component of the perovskite precursor material, and porous silica nanoparticles may react to form lead-containing silicate shells. As described above, the lead-containing silicate may include $Pb_2SiO_4$ and $Pb_4(SiO_4)Br_4$. In addition, the lead-containing silicate shell may have a thickness in a range of 1 to 50 nm, more preferably in a range of 3 to 30 nm. Within this range, the perovskite nanocrystals supported in the pores of the porous silica nanoparticles are effectively protected so that better photostability can be secured.

At this time, the calcination of step b) may be performed in a range of 300° C. to 1000° C., and more preferably, in a range of 500° C. to 600° C. If the calcination temperature is too low, $CsPbX_3$ perovskite nanocrystals may not be sufficiently famed, resulting in insignificant luminescent properties, if the calcination temperature is too high, the structure of the porous silica may collapse, and $CsPb_2X_5$, which is a reaction by-product, may be formed, which is not good. In addition, the calcination time may be 1 to 10 hours, more preferably 2 to 5 hours.

Thereafter, c) modifying the surface of the composite with a halogen group-containing silane compound may be performed. The halogen group-containing silane compound serves as an initiator in the subsequent atom transfer radical polymerization (ATRP) reaction, and although the modification method of this step is not particularly limited, for example, the halogen group-containing silane compound may be dissolved in a solvent, and then the composite may be added to the modification solution to modify the surface.

At this time, the halogen group-containing silane compound may be any one or a mixture of two or more selected from the group consisting of 3-(2-bromoisobutyloxy)propyldimethylchlorosilane, 3-(2-bromoisobutyloxy)propyldichloromethylsilane, 3-(2-bromoisobutyloxy)propyltrichlorosilane, 3-(methoxydimethylsilylpropyl)-2-bromo-2-methylpropionate, 3-(dimethoxymethylsilylpropyl)-2-bromo-2-methylpropionate, 3-(trimethoxysilylpropyl)-2-bromo-2-methylpropionate, (3-(2-bromoisobutyryl)propyl) dimethylethoxysilane, (3-(2-bromoisobutyryl)propyl) methyldiethoxysilane, (3-(2-bromoisobutyryl)propyl) triethoxysilane, (3-(2-bromopropionyl)propyl) dimethylchlorosilane, (3-(2-bromopropionyl)propyl) trichlorosilane, (3-(2-bromopropionyl)propyl) dimethylmethoxysilane, (3-(2-bromopropionyl)propyl) dimethylethoxysilane, and (3-(2-bromopropionyl)propyl) triethoxysilane, etc. The solvent may be any one or a mixture of two or more selected from the group consisting of an alcohol-based solvent such as ethanol, isopropyl alcohol; ether-based solvents such as diethyl ether, dipropyl ether, dibutyl ether, tetrahydrofuran, tetrahydropyran, diphenyl ether, and anisole; ketone-based solvents such as acetone, methyl ethyl ketone, methyl-n-propyl ketone, methyl-n-butyl ketone, diethyl ketone, cyclopentanone, cyclohexanone, 2,4-pentanedione, acetonylacetone, and acetophenone; amide-based solvents such as N,N-dimethylformamide, N,N-diethylformamide, acetamide, N-methylacetamide, and N,N-dimethylacetamide; ester-based solvents such as ethyl acetate, butyl acetate, and benzyl acetate; hydrocarbon-based solvents such as n-pentane, isopentane, n-hexane, isohexane, n-heptane, isoheptane, toluene, xylene, mesitylene, ethylbenzene, trimethylbenzene, methylethylbenzene, n-propylbenzene, isopropyl benzene, diethylbenzene, isobutylbenzene, triethylbenzene, di-isopropylbenzene, and n-amylnaphthalene; and the like.

Next, d) grafting a polymer brush onto the surface of the modified composite may be performed, and this step may be performed by an atom transfer radical polymerization (ATRP)) reaction as described above.

As a specific example, step d) may be performed by reacting the modified composite, the acrylic monomer, the metal catalyst, and the ligand.

In one embodiment of the present disclosure, as described above, the acrylic monomer may be any one or a mixture of two or more selected from the group consisting of alkyl (meth)acrylates such as methyl (meth)acrylate, ethyl (meth) acrylate, butyl (meth)acrylate, 2-ethylhexyl (meth)acrylate, n-octyl (meth)acrylates; hydroxyalkyl (meth)acrylates such as hydroxyethyl (meth)acrylate, hydroxypropyl (meth)acrylate, hydroxybutyl (meth)acrylate, and hydroxyhexyl (meth) acrylate; aminoalkyl (meth)acrylates such as aminoethyl (meth)acrylate, N,N-dimethylaminoethyl (meth)acrylate, and t-butylaminoethyl (meth)acrylate; alkoxyalkyl (meth) acrylates such as methoxyethyl (meth)acrylate and ethoxyethyl (meth)acrylate; carboxy group-containing monomers such as (meth)acrylic acid and carboxyethyl (meth)acrylate; and epoxy group-containing monomers such as glycidyl (meth)acrylate, and the metal catalyst may be copper (I) and copper (II) catalysts, and the ligand may be N,N,N',N",N"-pentamethyl diethylenetriamine (PMDETA) or the like, but is not particularly limited thereto.

At this time, the molar ratio of the acryl-based metal catalyst:monomer:ligand may be 1:1000 to 20000:5 to 50, and more preferably 1:5000 to 15000:10 to 30.

In addition, the reaction temperature in step d) may be in a range of 50° C. to 100° C., and the reaction time may be 1 to 10 hours.

Hereinafter, the luminescent nanoparticles and preparation method thereof according to the present disclosure will be described in detail with reference to Examples. However, the examples described above are presented only for illustrative purposes and are intended to limit the present disclosure. The present disclosure can be embodied in other forms in addition to the forms presented by the examples.

In addition, unless otherwise defined, all technical and scientific terms have the same meaning as that is generally understood by the ordinarily skilled in the art to which the present disclosure pertains. The terms used in the description of the specification of the present application are only intended to effectively describe specific examples and are not intended to limit the present disclosure. The units of the amounts of additives, which are not specifically stated herein, may be % by weight.

Preparation Example 1

First, mesoporous $SiO_2$ (m-$SiO_2$) was synthesized by a modified Stoeber method. Specifically, 3 mM of cetrimonium bromide (CTAB) was dispersed in deionized water (600 ml) and stirred at 40° C. for 30 minutes. Ethanol (250 mL) and ammonium hydroxide (4.7 mL) were poured into the CTAB solution, followed by the dropwise addition of tetraethyl orthosilicate (TEOS, 4.7 mL) and heated to 60° C. for 48 hours under constant stirring. After cooling the solution to room temperature, the m-$SiO_2$ was filtered and washed with ethanol, and dried in an oven at 60° C. overnight. The obtained m-$SiO_2$ nanoparticles were placed in a 500° C. conduit in air and heat-treated for 3 hours to remove the remaining surfactant.

Next, CsBr and $PbBr_2$ (molar ratio 1:1) were mixed and pulverized with porous $SiO_2$ nanoparticles (mass ratio of CsBr/$PbBr_2$:$SiO_2$=1:2) and then calcined at a heating rate of ° C./min for 3 hours in an air atmosphere box furnace at 300° C. After cooling to room temperature, the powder was washed three times with deionized water to remove external $CsPbBr_3$ and unreacted precursors. Finally, $CsPbBr_3$—$SiO_2$ nanoparticles (NPs) were dispersed in dimethyl sulfoxide (DMSO).

Preparation Example 2

All processes except that the calcination temperature was changed to 400° C. were performed in the same manner as in Preparation Example 1.

Preparation Example 3

All processes except that the calcination temperature was changed to 500° C. were performed in the same manner as in Preparation Example 1.

Preparation Example 4

All processes except that the calcination temperature was changed to 600° C. were performed in the same manner as in Preparation Example 1.

Preparation Example 5

All processes except that the calcination temperature was changed to 700° C. were performed in the same manner as in Preparation Example 1.

Preparation Example 6

$CsPbBr_3$—$SiO_2$ NPs were synthesized in the same manner as in Preparation Example 3, but different amounts of CsBr and $PbBr_2$ (molar ratio 4:1 to 1:4) were used when synthesizing the $CsPbBr_3$—$SiO_2$ NPs.

Preparation Example 7

$CsPbCl_xBr_{3-x}$—$SiO_2$ NPs were synthesized using CsBr and $PbCl_2$ instead of CsBr and $PbBr_2$ as perovskite precursors, but different CsBr and $PbCl_2$ (molar ratio 4:1 to 1:4) were used.

Example 1

PMMA was grafted onto the surface of the $CsPbBr_3$—$SiO_2$ NPs prepared in Preparation Example 3 by surface-initiated atom transfer radical polymerization (SI-ATRP) method.

First, the surface of the $CsPbBr_3$—$SiO_2$ NPs was modified with 3-(2-bromoisobutyloxy)propyldimethylchlorosilane as an initiator. At this time, the graft density (ρ was adjusted high (>0.5 $nm^{-2}$) by adjusting the injection amount of the initiator.

The mixture of modified $CsPbBr_3$—$SiO_2$ ($CsPbBr_3$—$SiO_2$—I) NPs, methyl methacrylate (MMA), $CuBr_2$, and N,N,N',N",N"-pentamethyl diethylenetriamine (PMDETA) ligands was sonicated for 30 minutes in a shrink flask to form a uniform suspension. After three freeze-pump-thaw cycles, CuBr was added to the flask filled with nitrogen gas. The reaction was initiated by heating the solution in an oil bath (70° C.). In a typical reaction, the final molar ratio of the reaction components MMA:CuBr:$CuBr_2$:PMDETA was approximately 5000:1:1:11. After a reaction time (1 to 5 hours), the polymerization was stopped by exposing the catalyst to air. The product was precipitated in methanol and then dissolved in toluene. This process was repeated until the copper(II) catalyst was removed with the characteristic color (blue) disappearing. The final product, PMMA grafted $CsPbBr_3$—$SiO_2$ NPs, was dried in a vacuum oven at 60° C.

[Characterization]

1) Evaluation Method:

The weight-average molecular weight (Mw) of the PMMA chains was determined by gel permeation chromatography (GPC, Agilent 1100 series) composed of two columns (pLgel 5 μm MIXED-D&E column), an RI detector, and a 4th pump. The graft density of PMMA brushes was determined using thermogravimetric analysis (TGA/DSC1, Mettler-Toledo) in nitrogen up to 800° C. with a heating rate of 10° C./min. Transmission electron microscopy (TEM) images were obtained using a JEM 2010 electron microscope operated at 200 keV. Scanning TEM (STEM) images and energy dispersive X-ray spectroscopy (EDS) characterizations were performed on a JEOL 2100 electron microscope operated at 200 keV. X-ray diffraction (XRD) patterns were obtained using a Bruker AXS D8 diffractometer with Cu-Kα radiation at λ=1.54 Å. X-ray photoelectron spectroscopy (XPS) spectra were obtained using a Thermofisher Scientific/K-Alpha X-ray photoelectron spectrometer with a monochromatic X-ray source of Al Kα (hv=1486.6 eV). Fourier transform infrared spectroscopy (FTIR) spectra (400 to 4000 $cm^{-1}$) were obtained using a Bruker ALPHA-P. Nitrogen adsorption-desorption isotherms were performed at 77 K using a BELSORP-max analyzer. The specific surface area was calculated by the Brunauer-Emmett-Teller (BET) method. To estimate the elastic modulus and hardness, a nanoindentation experiment was performed using a KLA iMicro Nanoindenter equipped with a Berkovich indenter. The specimen was loaded to a maximum displacement of 500 nm at a constant indentation strain of 0.025/s.

UV-vis absorption spectra were obtained using a Shimadzu UV-2600 UV-vis spectrometer. A light emission spectrum was obtained at room temperature using a Hitachi F-7000 fluorescence spectrometer. The luminescence quantum yield (PLQY) was determined based on a comparative approach using 9,10-diphenylanthracene (DPA) dissolved in ethanol as a reference (PLQY=90%). Time-resolved PL decay spectra were obtained using Fluorolog-3 with TCSPC (Horiba Scientific) with 375 nm laser. The fluorescence attenuation curve was fitted by triexponential fitting, $$I(t)=C+\alpha_1 \exp(-\tau/\tau_1)+\alpha_2 \exp(-\tau/\tau_2)+\alpha_2 \exp(-\tau/\tau_1) \quad (1)$$

where I(t) is the strength, i is the lifetime, and C is the prior exponential factor. Average Life (τavg.) values were derived as the average of the triple exponential attenuation, $$r_{avg} = \frac{\alpha_1 r_1^2 + \alpha_2 r_2^2 + \alpha_3 r_3^2}{\alpha_1 r_1 + \alpha_2 r_2 + \alpha_3 r_3} = f_1\tau_1 + f_2\tau_2 + f_3\tau_3 + A \quad (2)$$

where f is the partial contribution of each attenuation component and A is a constant. The accuracy of the fitting was determined by $X^2$ to be in the range of 1±0.2.

2) Evaluation of Characteristics:

FIG. 2 is a transmission electron microscope (TEM) image of (a) porous $SiO_2$ NPs and (b) $CsPbEr_3$—$SiO_2$ NPs prepared according to Preparation Example 3, and FIG. 3 is a high-angle annular dark-field scanning transmission electron microscopy (HAADF-STEM), and energy dispersive spectroscopy (EDS) mapping images of $CsPbBr_3$—$SiO_2$ NPs prepared according to Preparation Example 3. Referring to FIGS. 2 and 3, the porous SiO NPs synthesized in the present disclosure had a diameter of 201.6±10.1 nm, well-controlled pores (average size of about 3.1 nm) and a large surface part (923.5 $m^2$/g), and it can be seen that Cs, Pb, and Br elements were supported in the porous $SiO_2$ NPs.

FIG. 4 is an X-ray diffraction (XRD) pattern analysis result of $CsPbBr_3$—$SiO_2$ NPs prepared by varying the calcination temperature according to Preparation Examples 1 to 5, and the XRD pattern shows a space group Pnma (a=8.370 Å, b=8.425 Å, and c=12.011 Å) confirms the orthorhombic $CsPbBr_3$ phase (PDF*54-0752). An unreacted CsBr phase was observed at a calcination temperature of 400° C. or lower, and a $CsPb_2Br_5$ phase was observed at a calcination temperature of 700° C. or higher, whereas a single phase $CsPbBr_3$ was synthesized at a calcination temperature of 500° C. to 600° C.

FIG. 5 is a real photograph image of $CsPbBr_3$—$SiO_2$ NPs synthesized under various conditions under sunlight and UV illumination (λ=365 nm). When the calcination temperature was changed, the molar ratio of CsBr:$PbBr_2$ was fixed at 1:1, and when the molar ratio was changed, the calcination temperature was fixed at 500° C. As shown in FIG. 5, bright yellow and green fluorescence were observed in samples treated at a temperature of 500° C. or higher and having a molar ratio of CsBr:$PbBr_2$ of 1:1 to 3:1.

As such, the optimal reaction conditions for the luminescent orthorhombic $CsPbBr_3$ phase were a calcination temperature of 500° C. and a molar ratio of CsBr:$PbBr_2$ of 1:1, and the optimized mass ratio of CsBr/$PbBr_2$:$SiO_2$ to achieve uniform crystallization of $CsPbBr_3$ was 1:2.

FIG. 6 shows FT-IR spectra of $SiO_2$ NPs treated at various heat treatment temperature conditions. All samples after initial heat treatment of pure $SiO_2$ NPs showed strong stretching ν(Si—OH) at 3743 cm 1, which is a general absorption band of silanol. It was also confirmed that the stretching ν (C—H) peaks at 2854 and 2923 $cm^{-1}$ and the bending ν (C—H) peaks at 1478 $cm^{-1}$ of the methyl and methylene groups of CTAB completely disappeared by heat treatment.

Silanol is an important functional group that easily reacts with inorganic compounds and metals to form organic/inorganic and organic/metal complexes, and the favorable interaction between the silanol group and precursors (CsBr and $PbBr_2$) can accelerate the further growth of limited nucleation and $CsPbBr_3$ crystals within porous SiO 2 NPs at relatively low temperatures (500° C.) FIGS. 7 to 12 are results of light stability analysis according to maximum PL wavelength (λmax), FWHM, PLQY, and time of $CsPbBr_3$—

$SiO_2$ NPs synthesized under different conditions (calcining temperature; 300° C. to 800° C., CsBr:$PbBr_2$ molar ratio; 1:4 to 4:1).

As shown in FIGS. 7 and 8, when calcined below 400° C., the thermal energy for $CsPbBr_3$ crystallization inside the pores is not sufficient, resulting in a negligible level of luminescence (PL) and a much lower PL wavelength (λmax<460 nm) was observed. $CsPbBr_3$ NCs with narrow PL emission (λmax=512 nm, FWHM=24 nm) can be successfully produced at 500° C. or higher (PLQY to 20%), but when the calcination temperature becomes too high, the mesoporous structure collapses and further growth of $CsPbBr_3$ crystals is inhibited in limited pores, resulting in reduced PLQY.

In addition, FIG. 9 shows that typical PL emission at λmax=512 nm is observed only in the molar ratio of CsBr:$PbBr_2$ from 1:1 to 4:1, indicating that an excessive amount of $PbBr_2$ is disadvantageous to the chemical reaction of CsBr and $PbBr_2$.

Overall, the PL spectrum and real photograph images show that the sample prepared under the conditions of a CsBr:$PbBr_2$ molar ratio of 1:1 and a calcination temperature of 500° C. exhibit the best optical properties and photostability.

FIG. 10 shows that no significant difference was observed in the PL and absorbance spectra when comparing $CsPbBr_3$ NCs synthesized through the high-temperature injection method with $CsPbBr_3$—$SiO_2$ and $CsPbBr_3$—$SiO_2$ NPs to which PMMA was grafted, indicating that $CsPbBr_3$ reacted in a solid state in porous $SiO_2$.

The $SiO_2$ NPs provide the high photophysical quality of the $CsPbBr_3$ NCs as well as strong chemical resistance to polar solvents (e.g., $H_2O$, dimethyl sulfoxide (DMSO), dimethylformamide (DMF), etc.) used in subsequent washing steps and SI-ATRP processes. FIG. 11 is an analysis of changes in PL intensity, FWHM, and PLQY when $CsPbBr_3$—$SiO_2$ NPs were dispersed in DMSO and stored for more than 5 months, and it was confirmed that the initial PL intensity, FWHM, and PLQY were almost maintained. Such excellent photostability suggests that the nanopores (to 3 nm) on the surface of the $SiO_2$ NPs may be surrounded by a thin and dense protective shell such as $SiO_x$ and silicate.

Meanwhile, in order to explore the change in the pore structure of $SiO_2$ NPs, nitrogen adsorption and desorption isotherm analysis were performed on pure $SiO_2$ and $CsPbBr_3$—$SiO_2$ NPs based on the calcination temperature (300° C. to 700° C.). As shown in FIG. 12, the pure $SiO_2$ NPs were porous with Brunauer-Emmett-Teller (BET) surface areas in the range of 922.5 to 836.2 $m^2/g$ and pore volumes in the range of 0.58 to 0.35 $cm^3/g$ at all calcination temperatures up to 700° C., thereby maintaining the porous structure. In contrast, the pore structure of $CsPbBr_3$—$SiO_2$ NPs started to collapse at 500° C., resulting in a significant decrease in BET surface area (154.2 $m^2/g$) and pore volume (0.05 $cm^3/g$). Nevertheless, the TEM images show that the initial pore structure and overall shape of the $SiO_2$ NPs still remain with the penetrated $CsPbBr_3$ NCs, indicating the formation of $CsPbBr_3$—$SiO_2$ NP such as core-shell (FIG. 2). As the calcination temperature increased above 600° C., the collapse of the pore structure apparently led to the formation of condensed solids and subsequent sintering with negligible surface area and pore volume. These results confirm that the porous $SiO_2$ NPs encapsulated under optimal calcination conditions (500° C.) can successfully protect the vulnerable $CsPbBr_3$ NPs in various chemical environments.

However, a collapsed pore structure was observed even in the presence of excess $PbBr_2$ at the same calcination temperature (500° C.), suggesting that excess $PbBr_2$ could accelerate the densification process due to the initiation of Si and O rearrangements due to —OH condensation to Si—O—Si. For example, the partial decomposition of $PbBr_2$ at low melting temperature (370° C.) generates gas $Br_2$ and metal Pb, and metal Pb can react with silanol in mesoporous $SiO_2$ NPs to produce lead-containing silicate.

FIG. 13 shows a representative high-resolution X-ray photoelectron spectroscopy (XPS) spectrum of $CsPbBr_3$—$SiO_2$ NPs calcined at 500° C., where the $Pb_4f$ dual line is clearly decomposed at 138.2 eV($Pb4f_{7/2}$), and 143.2 eV($Pb4f_{5/2}$) binding energies and the FWHM was much wider than pure $CsPbBr_3$ NCs for $Pb^{2+}$ ions (FWHM=1.0 eV, $Pb4f_{7/2}$ and $4f_{5/2}$ at 138.0 and 142.8 eV).

A more detailed analysis was performed through peak fitting calculations using Gauss-Lorentz curves. In particular, the Pb 4f XPS spectrum is deconvoluted with two doublets, indicating a clear distinction of $Pb^{2+}$ ions with different chemical environments. It was hypothesized that these peaks are related to Pb—Br (137.8 and 142.4 eV) and Pb—O (139.1 and 143.8 eV) bonding on the surface of $CsPbBr_3$—$SiO_2$ NPs, respectively.

The higher binding energy of the $Pb_4f$ peak is considered to result from the divalent state of Pb—O($Pb^{2+}$) bonds ($Pb4f_{7/2}$≈137.5 eV), which are stronger than the tetravalent O=Pb=O($Pb4f_{7/2}$≈137.7 eV) bonds ($Pb4f_{7/2}$≈138.5 eV). In this context, the O is spectrum also showed an additional shoulder peak at 530.7 eV due to O—Pb bonding (FIG. 13(*b*)).

These results mean that lead-containing silicate and bromide such as $Pb_2SiO_4$ and $Pb_4(SiO_4)Br_4$ can be produced through a lead-related condensation process at the interface between the penetrated $CsPbBr_3$ and the silanol part of $SiO_2$ NPs (FIG. 14). The framework of porous $SiO_2$ is stably maintained by a protective shell with dominant Si—O—Si bonds (FIG. 2). This was confirmed by the two deconvoluted peaks of the Si 2p and O is XPS spectra, corresponding to the slightly oxygen deficient $SiO_2$ phase.

FIGS. 15 and 16 are XRD pattern analysis results for confirming the additional chemical reaction between the precursor ($PbBr_2$) and the porous $SiO_2$ NPs. With a small peak (blue line) from the intermediate monoclinic $Pb_4(SiO_4)Br_4$ phase (space group: P21/c, PDF 01-079-0542) with lattice parameters a=9.000 Å, b=16.217 Å, and c=8.404 Å at 500° C., several new peaks could be clearly observed at 2θ of 30.2°, 30.7°, and 31.2° (red lines) corresponding to planes (211), (112), and (300) on hexagonal $Pb_2SiO_4$ with lattice parameters a=9.928 Å and c=7.184 Å (PDF 00-039-0031). However, these peaks exhibit an amorphous phase with a small (100) peak at 21.8° due to crystallized silica (i.e., quartz) significantly reduced at high temperatures (700° C.), indicating the structural phase transformation observed in TEM images. Therefore, the improved photostability of $CsPbBr_3$—$SiO_2$ NPs is attributed to the formation of an encapsulation shell composed of lead silicate.

In addition, TGA/DSC thermal imaging shows that $PbBr_2$ was oxidized from the precursor over T≈370° C. (i.e., higher than $PbBr_2$ melting point) by Br 2 removal path under ambient conditions, followed by an endothermic reaction to produce lead silicate (FIG. 17).

FIG. 18 shows photographs of $CsPbBr_3$—$SiO_2$ (left panel) and PMMA-grafted $CsPbBr_3$—$SiO_2$ (right panel) NPs films under UV (λ=365 nm) and optical images.

The suspension of $CsPbBr_3$—$SiO_2$ NPs, such as ceramic, generally undergoes a drying process to manufacture colloidal films in various industrial processes, such as inkjet printing, which involves dynamics complicated by evaporation. $CsPbBr_3$—$SiO_2$ NPs exhibited low wettability with packed particles (i.e., coffee ring effects) at the edges induced by self-fixation of initial fixation and subsequent particles, resulting in heterogeneous optical properties associated with structural defects in emitted particle solids. Optical images also show powdery agglomerates and crack formation as a result of residual stress release in the colloidal film produced by evaporation of the colloidal solution.

In contrast, PMMA-grafted $CsPbBr_3$—$SiO_2$ NPs showed significantly improved processability (i.e., excellent wettability with reduced coffee ring effect) due to the formation of a crack-free and uniform coating due to dominant polymer-polymer interaction through entanglement between grafted polymer chains. These results show a transition from particle-like to polymer-like properties, with a change from brittle powder properties to flexible solid structures that can be peeled off the substrate without breakage. In addition, a sufficient amount of PMMA brush with a controlled molecular structure can exclude additional post-processing, such as polymer blending, which results in a complex dispersion state depending on the particle size, shape, and particle-polymer interaction.

Meanwhile, FIG. 19 is a TEM image of PMMA-grafted $CsPbBr_3$—$SiO_2$ NPs, and FIG. 20 is a thermogravimetric analysis (TGA) curve of PMMA-grafted $CsPbBr_3$—$SiO_2$ NPs, showing that PMMA was grafted well on the surface of $CsPbBr_3$—$SiO_2$ NPs.

FIGS. 21 and 22 evaluate mechanical properties such as elastic modulus and hardness, which were evaluated by nanoindentation of a film having a thickness of about 500 lam. FIG. 21 shows representative load-displacement curves for films of $CsPbEr_3$—$SiO_2$ and PMMA-grafted $CsPbEr_3$—$SiO_2$ NPs, showing a clear dependence of indentation formation on the presence of PMMA brushes. In particular, the slope of the load-displacement curve increased significantly for the PMMA-grafted $CsPbEr_3$—$SiO_2$ film and was much higher than that of the pure PMMA sample (Mn=120,000 g/mol). The average elastic modulus (E) and hardness (H) were determined from 30 load-displacement curves per sample (FIG. 22). The elastic modulus and hardness (E=3.99 GPa, H=0.21 GPa) of the PMMA-grafted $CsPbBr_3$—$SiO_2$ film also showed significant improvement compared to the $CsPbBr_3$—$SiO_2$ film (E=1.64 GPa, H=0.06 GPa), suggesting that the polymer brush can promote high bending strength and elasticity against external mechanical deformation.

Next, the effect of heating on the fluorescence emission performance was evaluated because the light stability of the light emitting layer (i.e., PMMA-grafted $CsPbBr_3$—$SiO_2$) at the operating temperature (to 75° C.) is important for ensuring high efficiency for practical application of the phosphor conversion LED device.

The evolution of PL spectra for $CsPbBr_3$ and PMMA-grafted $CsPbBr_3$—$SiO_2$ films was observed at selected temperatures ranging from 25° C. to 150° C. The PL intensity of $CsPbBr_3$ NCs decreased rapidly as the temperature increased. At 75° C., $CsPbBr_3$ NCs exhibited about 30% of the initial PL intensity at 25° C., and at 100° C., negligible PL intensity was observed due to significant thermal quenching following the redistribution of charge carriers to other energy levels due to excitation. Moreover, thermal annealing of $CsPbBr_3$ NCs has been reported to cause deformation into bulk materials in quantum-constrained NCs, indicating poor PLQY and color purity in the PL spectrum. In contrast, the PMMA-grafted $CsPbBr_3$—$SiO_2$ film exhibited delayed development of the PL spectrum and improved thermal stability over the entire temperature range (25° C. to 150° C.) (FIG. 23).

In addition, as shown in FIGS. 23 and 24, the initial PL intensity was completely recovered after heat treatment up to 150° C. (PL 100%), whereas the $CsPbBr_3$ film did not show recovery of PL emission. This process was repeated three times, and after each cycle, the bright green fluorescence of the PMMA-grafted $CsPbBr_3$—$SiO_2$ film confirmed that the optical properties were preserved even after heat treatment (FIG. 25). This suggests that the further growth of $CsPbBr_3$ NCs into the bulk material was inhibited due to the isolated pore structure of the porous $SiO_2$ NPs.

In addition, the surface defects of $CsPbBr_3$ NCs associated with thermal quenching can be reduced by the formation of lead silicate at the interface between the $CsPbBr_3$ and $SiO_2$ shells, as confirmed by the improved PL decay time (FIG. 26). FIG. 27 displays the time dependence of maximum PL intensity at operating temperature (T=80° C.). Negligible PL reduction was observed, which was not significantly different from the initial PL intensity, despite heat treatment for 1 month (T=80° C.)

As the feasibility of the proposed procedure for $CsPbBr_3$ penetration in porous $SiO_2$ NPs was successfully verified, a set of $CsPbCl_xBr_{3-x}$—$SiO_2$ NPs with various chemical compositions was prepared to explore the possible color spectrum in the visible range (Example 2). In particular, as the amount of $PbCl_2$ increased, the sintering of porous silica NPs became more prominent under the same conditions (500° C.), indicating slightly different chemical pathways to form lead silicate. The sharp color change (from green to blue) in the PL wavelength range of 430 to 514 nm can be controlled by adjusting the mole ratio of the precursors while maintaining photostability in various polar solvents for up to 5 months. Among them, the best optical properties for blue-emitting $CsPbCl_xBr_{3-x}$ were obtained under the optimal condition of $CsBr:PbCl_2$=1:1 at 450 C.

FIG. 28 shows that various adjustable colors having a narrow emission band of white LEDs can be obtained by simply mixing and arranging a red phosphor ($CsPbI_3$ NCs) and PMMA-grafted $CsPbBr_3$—$SiO_2$ NPs (W-1 to W-6) on a blue InGaN LED chip. FIG. 29 shows the color coordinates of the sample on the CIE chromaticity diagram, and the insertion diagram is a representative optical image of the PMMA-grafted $CsPbBr_3$—$SiO_2$ film under UV illumination. When applying PMMA-grafted $CsPbX_3$—$SiO_2$ NPs (X=Cl, Br, or I) to a phosphor-converted LED device, it should be noted that the presence of polymer brushes greatly improves solution processability and surface wettability during film formation, which are prerequisites for the actual application.

The present disclosure has been described with reference to some specific examples and characters. However, the specific examples and characteristics are only for illustrative purposes and are intended to limit the scope of the present disclosure, and it will be appreciated that various modifications and changes are possible from the above description by those skilled in the art to which the present disclosure pertains.

Therefore, the spirit of the present disclosure is not limited to the specific examples described above, and all forms defined by the appended claims and all equivalents and modifications thereto fall within the scope of the present disclosure.

What is claimed is:

1. A luminescent nanoparticle comprising a composite and a polymer brush grafted on a surface of the composite, the composite comprising:

a core containing a porous silica nanoparticle, a $CsPbX_3$ perovskite nanocrystal supported in the porous silica nanoparticle and a lead-containing silicate shell formed on a surface of the core, wherein X is a halogen.

2. The luminescent nanoparticle of claim 1, wherein the porous silica nanoparticles have a size in a range of 100 to 500 nm and an average pore diameter in a range of 1 to 10 nm.

3. The luminescent nanoparticle of claim 1, wherein the polymer brush comprises an acrylic polymer prepared by an atom transfer radical polymerization (ATRP) reaction.

4. The luminescent nanoparticle of claim 1, wherein the halogen X is any one or a mixture of two or more selected from the group consisting of Br, Cl, and I.

5. A method of preparing luminescent nanoparticles, the method comprising:

a) mixing and pulverizing porous silica nanoparticles, CsX, and $PbX_2$, wherein X is a halogen;

b) calcining a pulverized mixture to prepare a composite;

c) modifying a surface of the composite with a halogen group-containing silane compound; and d) grafting a polymer brush on the surface-modified composite, wherein the composite comprises: a core containing porous silica nanoparticles, and $CsPbX_3$ perovskite nanocrystals supported in the porous silica nanoparticles; and a lead-containing silicate shell formed on a surface of the core, wherein X is a halogen.

6. The method of claim 5, wherein the calcining is performed in a range of 300° C. to 1000° C.

7. The method of claim 6, wherein the calcining is performed for 1 to 10 hours.

8. The method of claim 5, wherein the halogen group-containing silane compound is any one or a mixture of two or more selected from the group consisting of 3-(2-bromoisobutyloxy)propyldimethylchlorosilane, 3-(2-bromoisobutyloxy)propyldichloromethylsilane, 3-(2-bromoisobutyloxy)propyltrichlorosilane, 3-(methoxydimethylsilylpropyl)-2-bromo-2-methylpropionate, 3-(dimethoxymethylsilylpropyl)-2-bromo-2-methylpropionate, 3-(trimethoxysilylpropyl)-2-bromo-2-methylpropionate, (3-(2-bromoisobutyryl)propyl) dimethylethoxysilane, (3-(2-bromoisobutyryl)propyl) methyldiethoxysilane, (3-(2-bromoisobutyryl)propyl) triethoxysilane, (3-(2-bromopropionyl) propyl) dimethylchlorosilane, (3-(2-bromopropionyl)propyl) trichlorosilane, (3-(2-bromopropionyl)propyl) dimethylmethoxysilane, (3-(2-bromopropionyl)propyl) dimethylethoxysilane, and (3-(2-bromopropionyl)propyl) triethoxysilane.

9. The method of claim 5, wherein the polymer brush is prepared by an atom transfer radical polymerization (ATRP) reaction.

10. The method of claim 9, wherein the grafting is performed by reacting a modified composite, an acrylic monomer, a metal catalyst, and a ligand.

11. The method of claim 5, wherein a weight ratio of the porous silica nanoparticles to CsX and $PbX_2$ is in a range of 1:0.1 to 1:10.

12. The method of claim 5, wherein a molar ratio of CsX to $PbX_2$ is in a range of 1 to 10:1.

13. The method of claim 5, wherein the porous silica nanoparticles have a size in a range of 100 to 500 nm and an average pore diameter in a range of 1 to 10 nm.

* * * * *